June 12, 1951 — E. M. DETERS — 2,556,872
LIQUID LEVEL CONTROL SYSTEM AND VALVE THEREFOR
Filed April 8, 1946 — 2 Sheets-Sheet 1
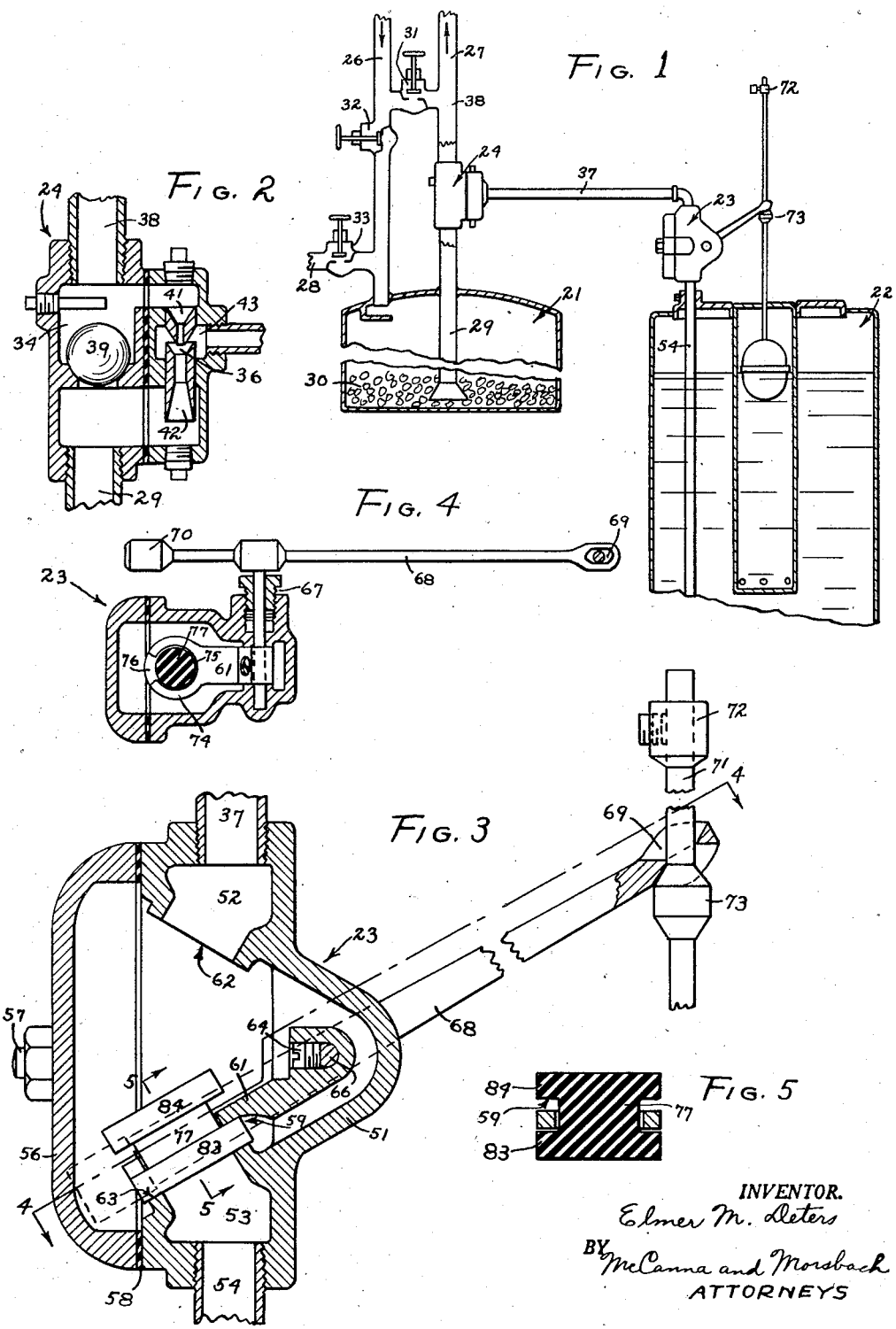
INVENTOR.
Elmer M. Deters
BY McCanna and Morsbach
ATTORNEYS June 12, 1951       E. M. DETERS       2,556,872
LIQUID LEVEL CONTROL SYSTEM AND VALVE THEREFOR Filed April 8, 1946                2 Sheets-Sheet 2

INVENTOR.
Elmer M. Deters
BY McCanna and Morsback
ATTORNEYS

Patented June 12, 1951

2,556,872

UNITED STATES PATENT OFFICE 2,556,872

LIQUID LEVEL CONTROL SYSTEM AND VALVE THEREFOR

Elmer M. Deters, Davenport, Iowa, assignor to Red Jacket Manufacturing Co., Davenport, Iowa, a corporation of Iowa Application April 8, 1946, Serial No. 660,559

9 Claims. (Cl. 137—104)

The present invention relates generally to liquid level control apparatus and particularly to apparatus for controlling the level in the brine tank of a base-exchange type water treating system.

To illustrate one application of the present invention it has been shown as it would be applied to a water treating system of the type having a treating tank containing brine-regeneratable base-exchange material, a brine tank, and valve and conduits for alternate service, regeneration, and rinsing steps. At the end of the service step when it is necessary to regenerate the base-exchange material the valving will be adjusted to direct water in series through an injector, the softening bed, and a discharge line to a sewer connection. The suction side of the injector will be connected to draw brine into this stream of water to effect the regeneration. After a certain predetermined quantity of brine has been so directed through the bed the suction side of the injector will be closed to allow the further passage of rinsing water to wash all traces of brine into the sewer. After rinsing, the valving will be readjusted to direct treated water to service outlets and to direct an initial quantity of water back through the injector to refill the brine tank. For the system to operate in this manner a brine valve must be contained in the injector suction line to (1) permit flow of brine to the injector during the regeneration step until the brine in the tank drops to a predetermined level, (2) prevent flow from the tank below that level during the rinsing step, and (3) allow back flow during the initial part of the service cycle to refill the brine tank to a predetermined maximum level, and then to positively shut off further back flow.

In early treating systems, a manually operable brine valve was provided which had to be opened or closed during each step in the operating cycle. This, of course, was undesirable and efforts were made to devise an automatically operated valve which would relieve the operator of the attention required to refill the brine tank with each regeneration. These automatic brine valves have been complicated both in construction and operation, some employing diaphragms responsive to one or more operating pressure differentials and others employing a double valve construction where one valve acts as the pilot or control valve for the other.

A principal object of the present invention, therefore, is to provide a simplified economical and dependable level controlling valve adapted for use as a brine valve or the like in which a single disk member interposed directly in the line of flow is actuated by the combination of pressure differential across the valve disk and by the movement of a float member between predetermined maximum and minimum float levels, the the disk member adapted to be pressure sealable against one or the other of the seats at the maximum and minimum float levels.

Another object of the invention is to provide a simplified liquid level control apparatus including a valve arranged so that it serves both as an inlet valve to admit liquid into a tank and also as a withdrawal valve permitting liquid to be taken from the tank. A still further object is the provision of a level control valve in which the construction is such that access to the interior parts for examination and repair is readily facilitated.

Other objects and advantages will be apparent from the following description and the accompanying drawings, in which:

Figure 1 is a diagrammatic elevational view of a water treating apparatus employing a brine valve embodying one form of the present invention;

Fig. 2 is an enlarged sectional view of the combined check valve and injector shown in Figure 1;

Fig. 3 is an enlarged cross-sectional view of the brine level control valve shown in Figure 1;

Figure 6:
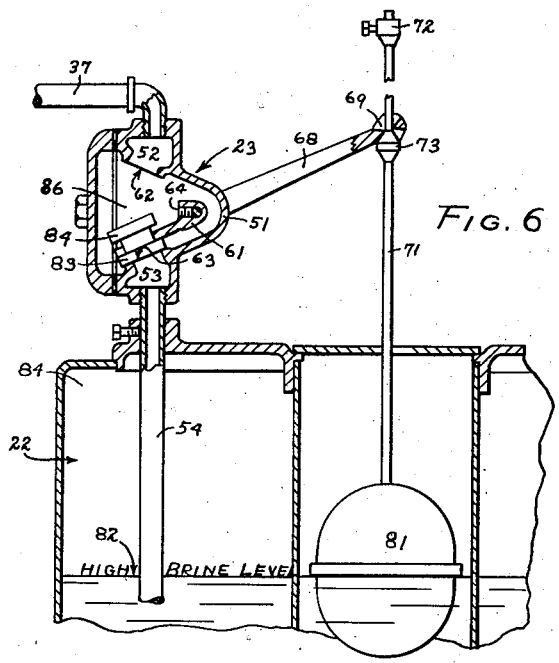
Figure 7:
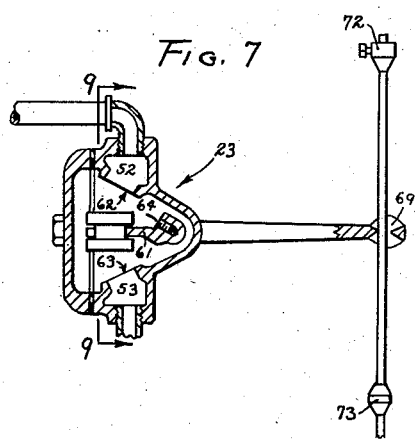
Figure 8:
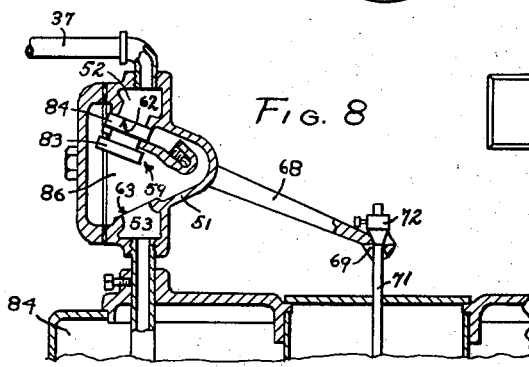
Figure 9:
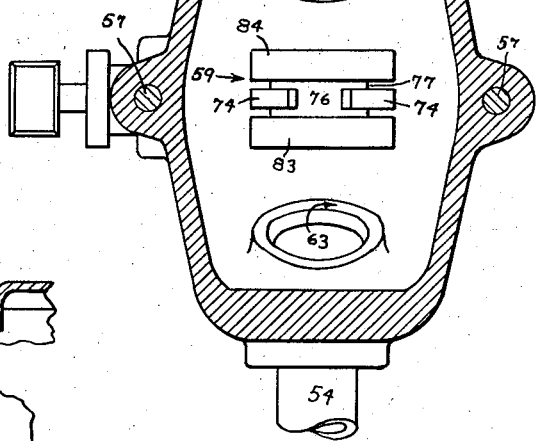

Figs. 4 and 5 are views of Fig. 3 taken along the lines 4—4 and 5—5, respectively;

Fig. 6 is a view of the brine valve and brine tank showing the parts at the high brine level positions;

Figs. 7 and 8 are views similar to Fig. 6 showing the parts in intermediate and low brine level positions, respectively;

Fig. 9 is an enlarged section taken on the line 9—9 of Fig. 7, and

Figure 10:
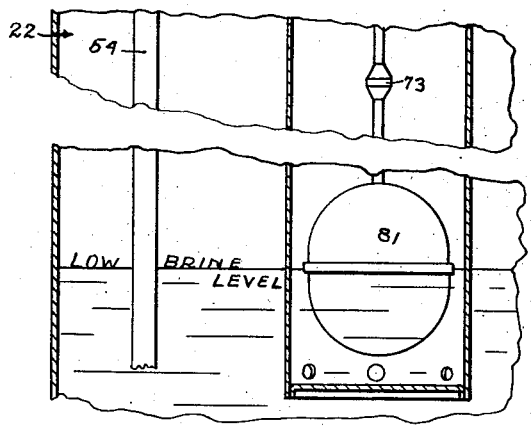

Fig. 10 is a modified view of a part of the invention.

Like reference characters refer to like parts throughout the figures.

The complete water treating system shown in Figure 1 will be first briefly described to provide a general background for a subsequent description of the component parts. The water treating tank is generally designated by the numeral 21, the brine tank by 22, the float operated brine valve by 23, and the combination check-and-injector-valve by 24. The term "brine" is used herein in its broadest sense where it includes solutions of sodium chloride, sodium hydroxide or any other suitable regenerating fluid. The valve 24 is disclosed in copending application, Serial No. 669,346, filed May 13, 1946, and reference may be had to that application for the details of its construction and operation.

Raw water, that is the water to be treated, is introduced into the system through a supply pipe 26. Treated water flows out the service pipe 27. And, during regeneration, waste water flows out of the pipe 28 to a sewer or other disposal point. For purposes of illustration, individual valves 31, 32, and 33 are shown, but it will be obvious that in practice they may be replaced by a single multiport valve. A complete operating cycle for the system will include steps of (a) treating, (b) regenerating, and (c) rinsing. For the treating step, valves 31 and 33 will be closed and valve 32 will be opened, whereby water entering through the pipe 26 will pass downwardly through the bed of zeolite or other suitable water treating agent 30 and pass upwardly through the pipe 29, the check valve portion 34 of the combination valve 24, and out the pipe 27 to service. During the initial part of the treating step the brine tank 22 will be refilled to its maximum level by reverse flow through the injector 36 and the pipe 37. For the regeneration step valves 31 and 33 will be opened and valve 32 will be closed, thereby allowing water to flow from the raw water inlet pipe 26 downward, through the pipe 38, and into the valve 24. Flow in this direction automatically seats the ball 39, diverting the flow through the injector 36 and into the pipe 29. A jet of high velocity water is discharged from the small nozzle 41 into the larger nozzle 42, thereby creating a low pressure in the chamber 43 which causes brine to be drawn through the suction pipe 37 into the treating tank 21 where it percolates slowly up through the bed of treating agent 30 and is discharged through the pipe 28 to waste. The rinsing step begins automatically without further manual adjustment of the valve as soon as a quantity of brine determined by the float operated brine valve 23 is withdrawn from the tank 22. At this time the flow of brine is automatically shut off as will be described in detail and brine-free water will be allowed to percolate upward through the bed 30 to flush all traces of brine to the sewer. During both regeneration and rinsing steps it will be noted that there is a direct connection between the inlet and service lines 26 and 27 so that the system is never rendered entirely inoperative for at such times raw water will be by-passed around the treating apparatus directly to service.

Referring now to Fig. 3 for a description of the valve generally designated 23 which illustrates a preferred form of my invention, it comprises a casing 51 having ports 52 and 53 which in Figure 1 are shown connected respectively to the suction pipe 37 and the brine draw pipe 54. The casing 51 is fitted with a cover plate 56 held in place as by bolts 57. A gasket 58 is interposed in fluid sealing relationship between the casing and cover plate. A double-headed disk member 59 is mounted on a movable lever 61 for arcuate movement between upper and lower valve seats 62 and 63, the lever 61 being mounted by means of the set screw 64 upon the rod 66 extending through the stuffing box 67 and connected at its outer end with the counter-balanced actuating arm 68, the latter having one of its end portions apertured as at 69 or otherwise suitably formed for engagement by the float member rod 71 and the stops 72 and 73. A counterweight 70 is provided at the opposite end portion of the arm 68.

With respect to the specific construction shown in Figs. 3, 4, and 5, one particular advantage resides in the ease with which the valve can be assembled and disassembled. The entire working parts inside the valve are completely exposed for inspection or repair by simpy removing the two bolts 57 and the cover plate 56. The circular portion 74 of the lever member 61 has a discontinuous or open portion 76 somewhat narrower than the diameter of the middle portion 77 of the disk member so that by constructing the disk, or at least its middle portion, of a resilient material such as rubber, it can be compressed or distorted sufficiently to insert it through the opening 76 where it will stay until forcibly removed. The set screw 64 is positioned so as to face the open end of the casing for ready access by a screw driver or wrench whereby the lever 61 may be quickly disengaged from the rod 66.

Considering now the operation of the present invention as applied to the water treating system illustrated, assume that the brine valve 23 is in the position indicated by Fig. 6 and that the float 81 and the brine level are at their upper limits. Assume further that the valving is adjusted to the treating step as previously described. Water, tending to back flow through the suction pipe 37 under line pressure will press the valve disk face 83 into fluid sealing relation with the lower seat 63 since the pressure in the valve port 53 is atmospheric, the same as that above the brine in the chamber 84.

When the valving is readjusted to draw brine through the suction pipe 37 in the regeneration step, the aspirating action of the injector 36 will produce a less-than-atmospheric pressure condition in the port 52 and interior chamber portion 86 whereby the atmospheric pressure existing in the brine chamber 84 will unseat the disk 59 and cause brine to flow past it upwardly through the valve. As soon as the brine level has dropped sufficiently to permit the lower float rod stop 73 to drop away from the arm 68, the latter will assume an intermediate level position, as shown in Fig. 7. This intermediate position of equilibrium will be maintained by reason of the construction making the disk and actuator arm counterbalance to seek this level position and by making the intermediate valve chamber 86 sufficiently large (as shown in the cross-section in Fig. 9) that the velocity forces of flow through the center portion of the valve will not move the disk from this equilibrium position. When the brine level drops below the point where the upper float rod stop 72 engages the actuating arm 68, the weight of the float and rod will draw the disk 77 upward toward the seat 62. A point will be reached when the disk is almost seated, for example, a 32nd of an inch or so from the seat 62, at which the pressure differential across the disk will rise suddenly due to the restricted flow area between the disk face 84 and the seat 62, and the disk will then be moved with snap action into pressure sealing engagement with the seat as shown in Fig. 8.

The closing off of the upper valve seat 62 as described above marks the end of the regeneration step and the beginning of the rinsing step, with brine-free water washing out the softening bed 30 in the manner already described. After this rinsing step has proceeded for the desired length of time the valving will be readjusted for the treating step in which raw water may enter the pipe 26 and treated water be directed to service through the pipe 27. When the valving is readjusted in this manner the pipe 37 will be changed from a condition of suction to a condition of pressure. The differential between the line pressure in port 52 and atmospheric pressure in the valve chamber 86 will move the valve disk away from the seat 62. It will be noted that the valve disk 77 is engaged by the lever 61 in such a manner as to provide a certain amount of axial movement independent of the lever in order that at this time the disk may be unseated slightly without necessitating that the pressure differential across the disk will have to lift the entire float assembly.

Refilling of the tank will proceed in much the same manner as already described in connection with emptying it. The stop 72 will be moved upwardly, thereby permitting the disk and actuator arm to assume the level or balance condition shown in Fig. 7 while continued upward movement of the float after a time moves the lower stop 73 into engagement with the arm causing the disk to be drawn downward into proximity with the lower seat 63 at which time the disk will be snapped suddenly downward into engagement with the seat by the rapid increase of pressure differential across the disk as described above in connection with the seating operation against the seat 62. The valve and float member will now again be in the high brine position shown in Fig. 6 with further communication between the pipe 37 and pipe 54 shut off by the valve 23.

Summarizing the operation of the disk 77 in moving between the seats, it is first unseated by a reversal of pressure differential across the disk and axial movement of the disk at this time independent of the lever 61 is provided so that the initial unseating can be accomplished without necessitating that the pressure differential be effective to lift or move the whole float member; then, by reason of the counter-balanced construction the disk seeks its intermediate or level position but at first is restrained by one of the float stops until the flow has been moved a certain initial distance, after which the float moves a certain further distance independent of the disk while the latter remains in this intermediate position; and, finally, by engagement by the other float stop, the disk is moved toward the opposite seat to a position proximate thereto at which time a sudden increase in pressure drop across the disk operates to snap it quickly into pressure sealing relation with the seat. Thus, a new principle of operation is provided in level controlling valves resulting from the combination of features described and claimed herein.

While I have shown an open ended lever 61 having the discontinuous portion 75 for the assembly of the disk, I do not wish to be limited to this specifically, for in some constructions it will be found desirable to make the circularly extending lever portion 74 entirely continuous as shown in Fig. 10 so that, in effect, the lever 61 may consist simply of a lever with an aperture 75 in the end of it. In such case, the H cross-sectioned rubber disk (Fig. 5) may be inserted simply by distorting it and forcing it transversely through the opening 75 instead of endwise through an opening such as 76.

I claim:

1. In a mechanism including a valve for controlling the flow of liquid in alternate directions, the combination of a valve body having two spaced ports, a valve member in said body movable between said ports for controlling the flow of fluid through said body, means including a shaft for supporting said valve member, a counterbalanced actuating arm connected to said shaft and normally tending to maintain said valve member at a position intermediate to said ports, and float means reciprocable between preselected positions engageable with said counterbalanced arm at each of said positions to move said valve member from said intermediate position to engagement with one of said ports.

2. In a valve mechanism for use in a system in which the direction of flow through the valve is alternately changed in accordance with predetermined external conditions, the combination of a valve body having two ported seats, a valve member in said body movable between said seats for terminating the flow of fluid through said body in either direction and arranged to be initially disengaged from said seats in response to a pressure differential between opposite sides of the valve member, means including a shaft in a horizontal plane for moving said valve member, a lost motion connection between said valve member and said latter means for snap movement of the valve member with respect to the said latter means for snap seating of said valve member under the action of fluid flowing through the body, a counter-balanced actuating arm connected to said shaft and tending to maintain said valve member at a position intermediate said seats, spaced abutments, and float means for controlling the position thereof, said abutments alternately engageable with said counterbalanced actuating arm for moving said valve member from said intermediate position into engagement with one of said seats in accordance with the predetermined external conditions.

3. Apparatus comprising a valve body having a relatively large chamber, spaced seats in said chamber and two fluid conducting ports associated therewith, a valve member in said chamber having opposed bearing surfaces adapted to respectively and alternately engage said seats in a fluid sealing relationship, a rotatable shaft, a lever having one end attached to said shaft and having its other end engaged with said valve member, means for mounting said valve member on said lever to have limited independent movement, an actuating arm having one end connected to said shaft and having its other end in spaced relation thereto, and means for counterbalancing said actuating arm to tend to move said valve member to a position of equilibrium between said seats, said chamber being of such size and shape at said equilibrium position as to substantially reduce the velocity of the fluid for movement around said valve member without substantial movement of the valve member from said intermediate position by the flow of fluid through the body.

4. A valve mechanism comprising a valve body having a chamber formed therein, two conducting ports in communication with said chamber and a valve seat adjacent each port, a shaft disposed in said body, a lever supported on said shaft for rotation therewith having a slotted end portion movable between the valve seats, a resilient distortable disc comprising opposed head portions each shaped to engage one of said valve seats and a central portion of smaller dimensions than the head portions integrally interconnecting the latter, said central portion being disposed in said slot, said head portions being spaced a distance apart greater than the thickness of said slotted end of the lever to form a lost motion connection between the disc and the lever, spaced abutments, float means controlling the position of said abutments, and a counterbalanced actuating member connected to said shaft and having a weighted end and an end engageable by said abutments for controlling the position of said disc in said body through said lost motion connection, said actuating member normally tending to maintain said disc at a position intermediate of said valve seats.

5. A float valve for terminating the flow of liquid to and from a liquid supply in response to a change in level of the liquid therein, comprising a valve body having two ports, one of which is in communication with said supply and an enlarged chamber between and in communication with said ports, a valve member in said chamber movable between said seats in sealing relation therewith for controlling the flow of liquid through the chamber, means for supporting said valve member for alternate movement from a first position engaging one seat and sealing one of said ports against flow of liquid therethrough from the chamber, to an intermediate position, in response to pressure in said one port greater than the pressure in the valve chamber for flow of liquid through the chamber and past the valve member in the direction of movement of the valve member, and float means adapted to be disposed in the liquid supply and responsive to a change in level thereof operatively connected with said last-mentioned means for moving the valve member from the intermediate position to a position engaging the other seat and sealing said other port against flow of fluid in the aforesaid direction at a predetermined liquid level of said supply.

6. The combination recited in claim 5 with lost motion connection means between said valve member and the support means therefor for effecting snap seating of the valve member in response to a pressure differential existing on opposite sides of the valve member as the latter approaches sealing engagement with the respective ports.

7. A float valve for terminating the flow of liquid to and from a liquid supply in response to the change in level of the liquid, comprising a valve body having two spaced ports for the flow of liquid therebetween, a seat adjacent each port and an intermediate enlarged chamber between and in communication with said ports, a valve member in said chamber movable between sealing positions with said seats and having a position intermediate said seats for controlling the flow of liquid through the chamber, means for supporting said valve member for alternate movement from a first position engaging one seat and sealing one of said ports against flow of liquid therethrough from the chamber to an intermediate position in response to pressure in said one port greater than the pressure in the valve member for flow of liquid through the chamber and past the valve member in the direction of movement of the valve member, a weighted arm connected to said valve member normally tending to maintain said valve member in an intermediate position, and float means adapted to be associated with said liquid supply and connected to said arm for moving the valve member from the intermediate position to a position engaging the other seat and sealing said other port against flow of liquid in the aforesaid direction at a predetermined liquid level of said supply.

8. A float valve for use with a liquid supply, comprising a valve body having a chamber and two ports, a rotatable shaft mounted in said valve, a lever attached to said shaft movable between said ports and supported to occupy a position intermediate said ports during flow of liquid through the valve, an actuating arm attached to said shaft and rotatable for controlling movement of the lever, a pair of oppositely spaced valve members mounted on said lever and movable from the intermediate position to one extreme position for engagement of one of said members with one of said seats to terminate flow from the valve therethrough and from the intermediate position to another extreme position for engagement of the other of said valve members with the other of said seats to terminate flow from the valve therethrough, said valve members being initially movable away from their associated seats in response to a pressure differential between said ports, float means movable in response to changes in the liquid level, and a pair of spaced abutments movable by said float means and engageable with said actuating arm to move the lever from the intermediate position toward the extreme positions, said abutments being spaced at positions corresponding to the maximum high and the minimum low levels of the liquid supply and each of said levels corresponding to a position wherein one of said valve members engages one of said seats.

9. A float valve comprising a valve body having a chamber and two spaced ported seats, a disc member in said body arranged to be positioned intermediate said seats and having oppositely facing bearing surfaces adapted to be pressed into liquid sealing engagement with said seats for controlling the flow of liquid through the valve in opposite directions, said disc being supported for initial movement from seated relation with one of said ported seats to said intermediate position when the pressure in the chamber is less than in the port of said one ported seat and for initial movement from seated relation with the other ported seat to said intermediate position when the pressure in said chamber is less than the pressure in the port of said other ported seat, a rotatable shaft in said body, a lever in said body having one end mounted on said shaft and having the other end engaging said disc member for arcuate movement of the latter between said seats, means for mounting said disc on said lever for limited movement independent of said lever to provide for alinement of the bearing surfaces with said seats, an actuating arm on the exterior of said body connected to said shaft, a rod loosely engaged by said actuating arm, a pair of spaced collars on said rod engageable with said arm, a float connected to one end of said rod to move said collars in preliminary lost motion movement into engagement with the arm and thereafter move said disc from said intermediate position to one seated position in one direction of movement of the float and to move said disc from said intermediate position to its other seated position in the other direction of movement of the float and a counterweight operatively associated with said actuating arm of a mass sufficient to balance said arm normally tending to maintain said disc in said intermediate position in said body.

ELMER M. DETERS.

(References on following page)

REFERENCES CITED

The following references are of record in the file of this patent:

UNITED STATES PATENTS

| Number | Name | Date |
|---|---|---|
| 173,266 | Calahan | Feb. 8, 1876 |
| 260,490 | Martin | July 4, 1882 |
| 291,668 | Barker | Jan. 8, 1884 |
| 409,617 | Smith | Aug. 20, 1889 |
| 420,649 | Williams | Feb. 4, 1890 |
| 940,182 | Morgan | Nov. 16, 1909 |
| 945,083 | Dane | Jan. 4, 1910 |
| 1,744,493 | Nix | Jan. 21, 1930 |
| 1,851,927 | McCord | Mar. 29, 1932 |
| 2,017,033 | McGriffin | Oct. 8, 1935 |
| 2,035,747 | Harris | Mar. 31, 1936 |
| 2,204,885 | Chamberlin | June 18, 1940 |
| 2,288,231 | Drane | June 30, 1942 |

FOREIGN PATENTS

| Number | Country | Date |
|---|---|---|
| 2,385 | Great Britain | Feb. 6, 1900 |